(12) United States Patent
Winicki (10) Patent No.: US 6,385,164 B1
(45) Date of Patent: May 7, 2002

(54) PROTECTIVE COVER FOR AN OPTICAL DISC

(76) Inventor: Douglas G. Winicki, 29 Church Rd., Great River, NY (US) 11739-0417

( * ) Notice: Subject to any disclaimer, the term of this patent is extended or adjusted under 35 U.S.C. 154(b) by 0 days.

(21) Appl. No.: 09/590,112

(22) Filed: Jun. 8, 2000

Related U.S. Application Data (60) Provisional application No. 60/179,733, filed on Feb. 2, 2000.

(51) Int. Cl.$^7$ ............................. G11B 7/24; G11B 33/14
(52) U.S. Cl. ....................................... 369/291; 369/283
(58) Field of Search ................................ 369/283, 286, 369/289, 291; 428/66.6, 66.7, 128

(56) References Cited

U.S. PATENT DOCUMENTS

| | | | | |
|---|---|---|---|---|
| 4,539,573 A | * | 9/1985 | Marchant et al. | 346/137 |
| 4,556,968 A | | 12/1985 | Pelkey et al. | 369/287 |
| 4,879,710 A | | 11/1989 | Iijima | 369/291 |
| 4,983,437 A | | 1/1991 | Merrick | 428/40 |
| 5,757,765 A | | 5/1998 | Chen | 369/291 |
| 5,787,069 A | | 7/1998 | Lowe et al. | 369/291 |
| 5,791,467 A | | 8/1998 | Mahone | 206/308.1 |
| 5,922,430 A | | 7/1999 | Biddlecome | 428/66.6 |
| 5,935,673 A | | 8/1999 | Mueller | 428/64.1 |
| 6,054,009 A | | 4/2000 | Cote et al. | 156/249 |
| 6,077,583 A | * | 6/2000 | Park | 428/64.1 |
| 6,144,632 A | * | 11/2000 | Burroughs | 369/291 |
| 6,240,061 B1 | * | 5/2001 | Burroughs | 369/291 |

FOREIGN PATENT DOCUMENTS

| | | | |
|---|---|---|---|
| GB | 2 315 906 A | * | 2/1998 |
| WO | 97/05609 | * | 2/1997 |

* cited by examiner

*Primary Examiner*—William Klimowicz
(74) *Attorney, Agent, or Firm*—Edward W. Porter

(57) ABSTRACT

An optical disc protector includes a circular main surface and a peripheral lip. The main surface is a circular sheet of optically clear material having a diameter slightly larger than most optical discs on which it is to be mounted and having a mounting hole in its center. The peripheral lip is attached to, and extends all the way around, the perimeter of the circular main surface. It extends away from the main surface at an inward angle, so the smallest diameter of the peripheral lip is smaller than the diameter of the optical discs on which the protector is to be used. The peripheral lip is flexible so as to push against the circular edge of an optical disc upon which the protector is mounted. In many embodiments, the lip does not contain a clasp for grabbing against the side of the optical disc opposite from the side against which the main surface of the protector lies when mounted. The main surface can be made of polycarbonate, which can be capable of holding an electrostatic charge so as to electrostatically attract the disc protector to an optical disc on which it is mounted. In some embodiments, the protector's circular main surface has a slightly dome-like shape, which helps prevent the perimeter of the main surface from being bent up away from the outer edge of an optical disc upon which the protector is mounted.

18 Claims, 9 Drawing Sheets

PROTECTIVE COVER FOR AN OPTICAL DISC

RELATED APPLICATIONS

This application is a continuation-in-part of and claims priority under 35 U.S.C. § 119(e) from the U.S. provisional application Ser. No. 60/179,733 filed by Douglas G. Winicki on Feb. 2, 2000, entitled "Optical Disc Mask" (hereinafter "The Provisional Application"). The Provisional Application is also hereby incorporated by reference.

FIELD OF THE INVENTION

The invention relates to a protective cover for an optical disc.

BACKGROUND OF THE INVENTION

Optical discs have been in use since the early 1980's and have largely replaced vinyl phonograph records as a major medium for recording and playing back of audio information. Optical discs currently come in multiple different forms. Compact discs (CDs) are commonly used to record music. CD-ROMs are commonly used to record data for use by personal computers. Digital versatile discs (DVDs), which have an even larger capacity to store data than CDs and CD-ROMs, are commonly used to record video as well as large amounts of digital data for other purposes. There are other types of optical discs including: CD-Rs on which a user can write, but not re-write, information; CD-RWs on which users can both write and re-write data; and laserdiscs, an old, large-sized optical disc for recording video programming. It is probable that there will be new types of optical discs in the future from which recorded information can be read by light.

Optical discs have many benefits. They are much smaller than many other products capable of storing an equal amount of data. Often their data can be read with virtually perfect accuracy despite the presence of dust. This is due, in part, to their recording of redundant information to help them correct minor reading errors. And since they are read optically, the process of reading them does not wear out their data recording surfaces. Unfortunately, however, scratches on the surface of an optical disc can reduce the ability of the laser circuitry that reads such discs to track or read data on the disc, making all or a portion of such an optical disc unreadable.

An optical disc is comprised of two sides. Both are important in the laser circuitry's ability to read information encoded on the disc.

The read, or data, side is read by the laser circuitry directly by focusing a light beam on a very small point on the disc and "reading" small pits or impressions which represent the 1's and 0's that make up the data stream that encodes audio, video, or data information. Any substantial scratch in the clear coating on the read side of the disc can undesirably block or deflect light, causing the laser circuitry to misread data or become confused as to where it is in the context of the binary data stream. This can cause the player to play the same block of data repeatedly, which, in the case of an audio CD, produces a sound similar to the "skipping" which commonly occurred in the playback of scratched vinyl records. In some cases such scratches can force the playback of the optical disc to stop entirely.

The second side of an optical disc, the "label" side, does not record laser-readable information, but it does serve an important role in the playback of such information. In addition to providing a surface upon which a label for the disc can be written or printed, the label side has a thin reflective layer needed to provide a relatively even reflective background to the layers of the disc's read side on which information is recorded. This relatively even backdrop for the data side allows the laser circuitry to more easily discern between 1 and 0 bits.

A scratch on the label side deep enough to tear into its reflective layer can render its disc unreadable. This condition can be observed by holding the optical disc up to a light source and viewing the holes in the reflective layer allowing light to pass through.

SUMMARY OF THE INVENTION

It is an object of the invention to provide a protective cover for optical discs that helps protect them from damage due to scratching.

It is another object of the invention to provide such a protective cover that is relatively easy to mount onto an optical disc.

It is yet another object of the invention to provide such a protective cover that tends to remain on an optical disc once it has been mounted on that disc.

It is still another object of the invention to provide such a protective cover that is relatively easy to remove from an optical disc once it has been mounted on that disc.

According to one aspect of the invention, an optical disc protector is provided for being mounted upon and protecting at least one side of an optical disc. The protector includes a circular main surface and a peripheral lip. The circular main surface has a diameter the same as, or slightly larger than, the optical discs on which the protector is designed to be mounted. The main surface is in the form of a sheet that has two substantially parallel sides: a disc-facing side intended to face the optical disc upon which the protector is mounted, and an exterior-facing side that is intended to accept the damage from mishandling on behalf of the optical disc. The main surface is made of an optically clear material, so as not to interfere with the reading of data from an optical disc upon which the protector has been mounted. The main surface also has a hole in its center to allow an optical disc upon which such a protector is mounted to be used in an optical disc reader. The peripheral lip is attached to, and extends all the way around, the perimeter of the circular main surface. The peripheral lip extends away from the perimeter of the disc-facing side of the main surface at an inward angle towards the center of the optical disc protector. As a result, the diameter of the peripheral lip at its end furthest from the main surface is smaller than the diameter of the main surface and of the optical discs on which the protector is designed to be used. The peripheral lip is flexible so as to push against the edges of an optical disc upon which the protector is mounted.

In embodiments of the invention, the lip does not contain a clasp for grabbing against the side of the optical disc opposite from the side against which the disc-facing side of the main surface is designed to lie. In some embodiments, the optically clear material of which the main surface is made is polycarbonate. In some such embodiments, the polycarbonate is capable of holding an electrostatic charge, and is charged so the main surface is electrostatically attracted to an optical disc on which the disc protector is mounted. In some embodiments, the circular main surface is substantially flat. In others it has a slight dome-like shape to make its peripheral edge resist bending (or lifting) away from the edge of an optical disc upon which the protector has been mounted. This dome-like curvature of the main surface can extend in either of two directions: one which makes its exterior-facing side concave and its disc-facing side convex; or one which makes its disc-facing side concave and its exterior-facing side convex. For purposes of simplification, disc protectors which have this dome-like curvature will often be referred to in this specification and the claims as "concave", even though they will appear as convex if viewed from the other side.

In some embodiments in which the dome-like curvature makes the disc-facing side convex when the protector is mounted on an optical disc, the flat surface of the disc pushes against the convex curvature of the disc-facing side, tending to deform the disc protector in a way which creates an arch or "dome" opposite in shape to the disc protector that is not mounted. This inside-out transformation when mounted on an optical disc utilizes the physical strengths that an arch or a dome provide in resisting the upward lifting of the outer edge, and also pushes the peripheral lip inward so as to increase the tightness with which the peripheral lip grips the edge of the optical disc.

In some embodiments, the thickness of the sheet formed by the circular main surface is between five and seven mils. The optical disc protector can be formed in multiple different ways, including a thermoform process (i.e., vacuum forming) or die 5tamping process. In some embodiments the depth of the peripheral lip, that is the distance by which it extends away from the main surface of the protector, is approximately equal to the thickness of the optical discs which the protector has been designed to cover. In other embodiments, the depth of the peripheral lip is approximately equal to one half the thickness of such optical discs.

According to other aspects of this invention, differing combinations of the above features are provided.

DESCRIPTION OF THE DRAWINGS

These and other aspects of the present invention will become more evident upon reading the following description of the preferred embodiment in conjunction with the accompanying drawings, in which.

DETAILED DESCRIPTION OF SOME PREFERRED EMBODIMENT

Figure 1:
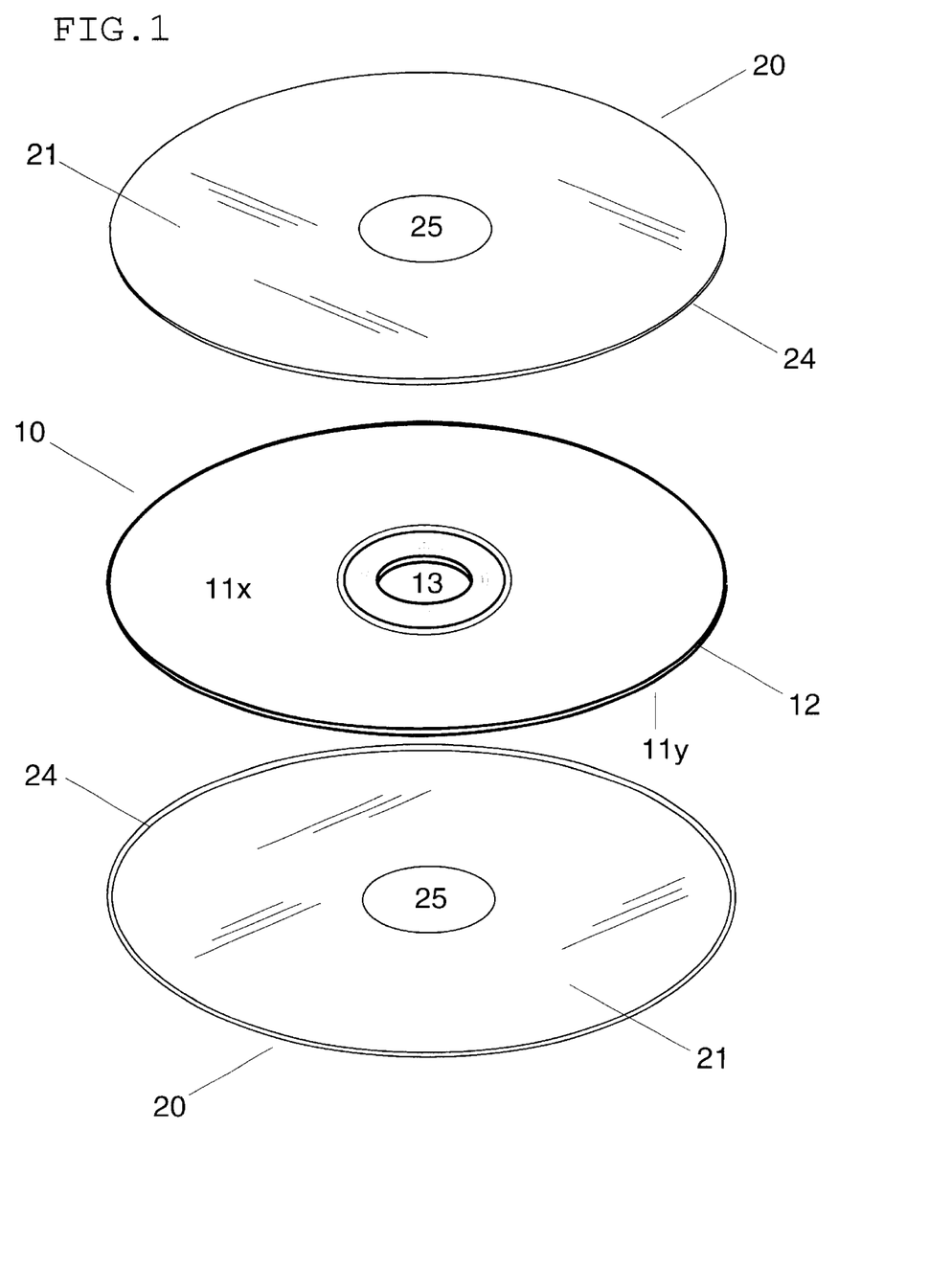
FIG. 1: is an exploded view of two optical disc protectors embodying the present invention shown on opposing sides of one optical disc.

The optical disc protector, or mask, 20 shown in FIG. 1, is comprised of an optically clear material whose main surface 21 is of a circular shape having a diameter equal to, or slightly greater than, that of the optical discs on which it is to be used.

The perimeter of the protector, or mask, 20 possesses a continuous lip 24 designed to embrace the optical disc 10 around its outer edge 12. Because this lip does not reach around to cover the opposite side of the disc, it is relatively easy to place it around the edge of a disc than would be otherwise possible.

As is described below in more detail the perimeter lip is angled inward so that its circular edge which points away from the main surface has a smaller diameter than the main surface of the disc protector, and a smaller diameter than most optical discs. When the protector is mounted on an optical disc having a larger diameter than the lips edge, the perimeter lip has to be deformed to make room for the disc, and the resilience of the lip's material allows the lip to press against the disc's edge, tending to grip it. Because of the flexibility of the lip, the lip can be successfully mounted around optical discs with slightly varying diameter. Since most optical discs are very close in size, if the diameter of the protector's circular area is made slightly larger than the average diameter of standard optical discs, the protector will be able to work well with most such discs because the spring-like action of the peripheral lip 24.

The embodiments of the optical disc protector 20 shown in FIG. 1 is designed to cover only one surface, or side, 11x of the optical disc 10. A second, similar protector 20 can be used to cover the opposite side 11y of the disc, so the disc can be fully encased. In such embodiments of the invention, the lip 24 is designed to cover no more than approximately ½ of the thickness of the optical disc's side 12. Other embodiments of the invention are designed for a use in which a disc protector is applied to only one side 11x or 11y of a disc. In such embodiments, the length of the perimeter lip 24 in a direction roughly away from the protector's main surface can be increased so that more than ½ of the optical disc's edge 12 is covered by the lip.

The protector 20 includes a mounting hole 25 located in its center that is slightly larger than the mounting hole 13 of the optical disc 10. The hole 25 is large enough so that when an optical disc on which a protector is mounted is handled, the user's finger will be less likely to catch the inner edge of the protector hole 25. This reduces the chance that the user's fingers will pull the protector 20 away from the optical disc 10.

The protector 20 is made of an optically clear film. For the protector to properly allow data to be read from a disc on which it is mounted, it is desirable for it to have an 89% or greater light transmission ability and a refractive index of less than 1.6. In many embodiments of the invention the protector is made of polycarbonate. Some brands of polycarbonate which can be used for this purpose include PETG (Eastman Chemical Products, Inc., Kingsport, Tenn.), LEXAN (G.E. Plastics, Pittsfield, Mass.), and MAKROFOL (Bayer Polymers Division, Pittsburgh, Pa.). These polycarbonates have good optical clarity, a low refractive index, and possess the capability to easily develop and hold an electrostatic charge.

Preferably the disc protectors are formed from a film or sheet of such material between 0.005" (5 mils) to 0.007" (7 mils) in thickness. This is so the protectors will be thin enough to enable a disc on which one or two of them are mounted to be properly played in an optical disc player, yet thick enough to provide considerable protection against scratches to the surface of the disc.

The disc protectors can be manufactured by a thermoform, or die-stamping process. When manufacturing embodiments of the disc protector having the concavity shown in FIGS. 2a, 3a, and 4a, a thermoform or vacuum form process preferably is used. In embodiments, such as those shown in FIGS. 2b, 3b, and 4b, which do not have such concavity, die stamping can also be used.

In order for the disc protectors of the present invention to work well, they should be accurately manufactured to a very fine tolerance. This will greatly increase their ability to stay attached to any optical disc on which they are mounted when the disc is being played and when it is being handled.

Figure 2A:
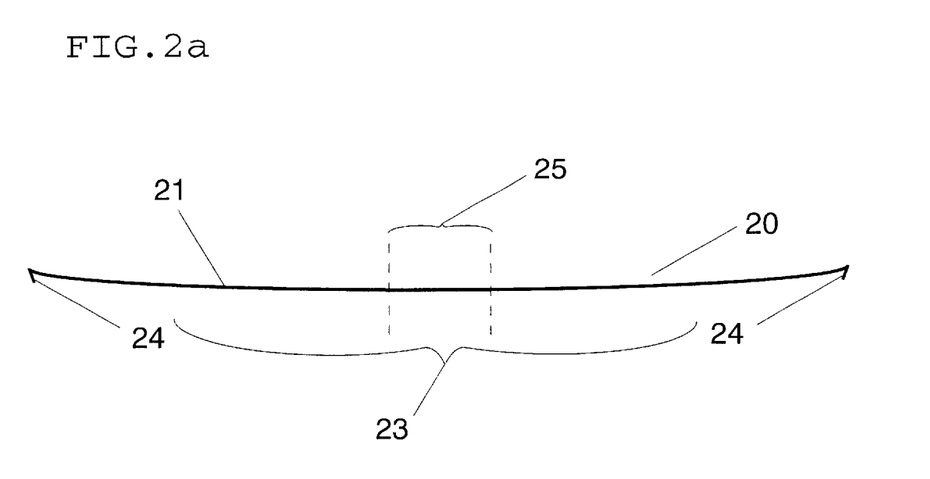
FIGS. 2a and 2b, respectively, are cross-sections of a concave and a non-concave embodiment of the invention's optical disc protector.

FIG. 2a, shows a cross-sectional view of an embodiment of the disc protector 20 having a slight concavity, or inverted dome-like shape, 23. In this figure, and in FIGS. 3a and 4a, the concavity is exaggerated to make it more apparent. The degree of the concavity can vary considerably. In one embodiment the magnitude of the concavity is such that the distance from the center of the concave main surface (before the mounting hole is cut out of it) to the plane in which the circumference of the main surface lies is approximately one fiftieth of an inch. This concavity can be molded into the shape of the main surface 21 through the thermoform or vacuum form process.

Figure 3A:
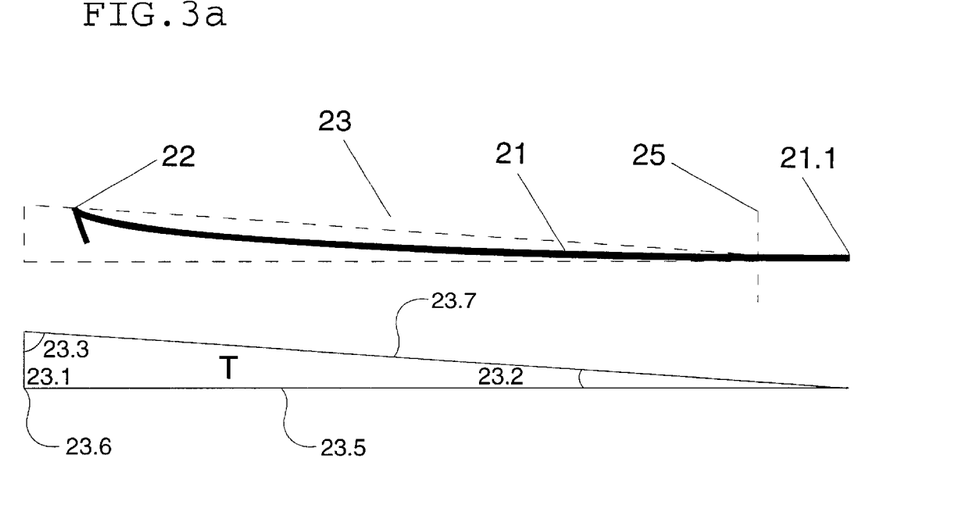
FIGS. 3a and 3b are close-ups of the cross-sections shown in FIGS. 2a and 2b, respectively, showing the perimeter of the disc protector where a lip extends at an angle from the protector's main surface.
Figure 4A:
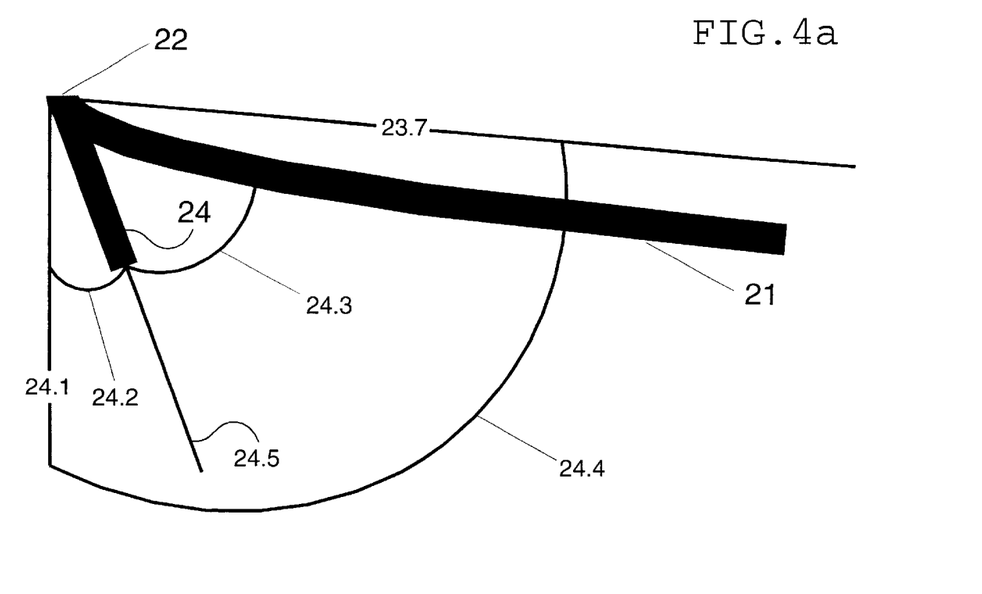
FIGS. 4a and 4b are even larger close-ups of the cross-sectional views shown in FIGS. 3a and 3b, respectively.

The continuous perimeter lip 24 formed all the way around the circumference of the protector 20 is also apparent in this figure and is shown in greater detail in FIGS. 3a and 4a. The position of the mounting hole 25 is indicated by the dotted lines 25 in FIGS. 2a and 3a.

Figure 2B:
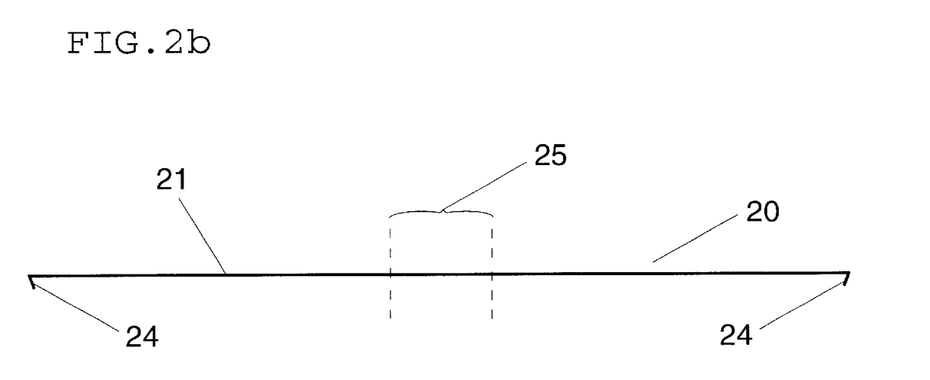

FIG. 2b shows a cross-sectional view of an embodiment of the disc protector 20 similar to that shown in FIG. 2a, except that it does not have the concavity 23 shown in FIGS. 2a, 3a, and 4a. Such an embodiment can easily be manufactured by die-stamping, as well as the thermoform or vacuum form, process. The continuous perimeter lip 24 formed all the way around the circumference of the protector 20 is also shown in FIG. 2b, and is illustrated in even greater detail in FIGS. 3b and 4b.

The enlarged view in FIG. 3a shows a cross-section of the disc protector in FIG. 2a along half of its diameter. Its increased magnification helps better illustrate the concavity 23 of the protector's main surface 21 shown in FIG. 2a. The concavity 23 can be defined by a triangle T shown in FIG. 3a. This triangle has a right angle labeled 23.1 formed between the junction of a base plane 23.5 tangent to the theoretical center of the protector's main surface 21.1 (i.e., the center it would have if the mounting hole 25 in FIG. 2a had not been cut out) and a line 23.6 perpendicular to that base plane. The acute angle labeled 23.2 is formed between the base plane 23.5 and a sloped line 23.7 extending from the theoretical center of the protector's main surface 21.1 to the circular outer edge, or perimeter, 22 of the main surface. The triangle's second acute angle, labeled 23.3, is formed between the sloped line 23.7 just described and the perpendicular line 23.6 used to form the right angle 23.1.

Figure 3B:
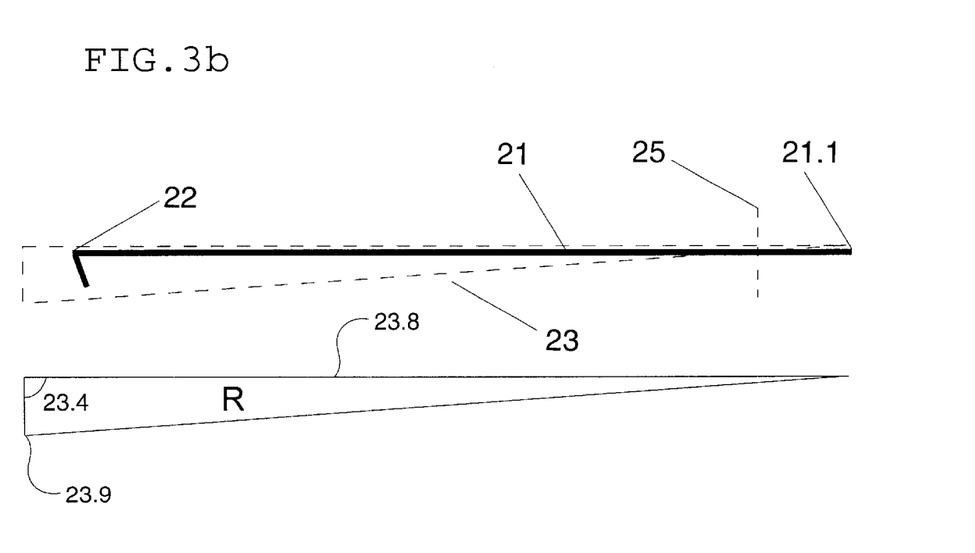

The enlarged cross-sectional view in FIG. 3b, is similar to the view shown in FIG. 3a, except it illustrates half of the cross-section of the disc protector shown in FIG. 2b, which has no concavity. In FIG. 3b the triangle T is replaced with a triangle R which has a right angle labeled 23.4 in the upper left-hand corner corresponding to the acute angle 23.3 in FIG. 3a. The angle 23.4 is formed at the junction of the base plane 23.8 tangent to (and substantially coplanar with) the disc protector's main surface and line 23.9 perpendicular to that base plane.

Figure 4B:
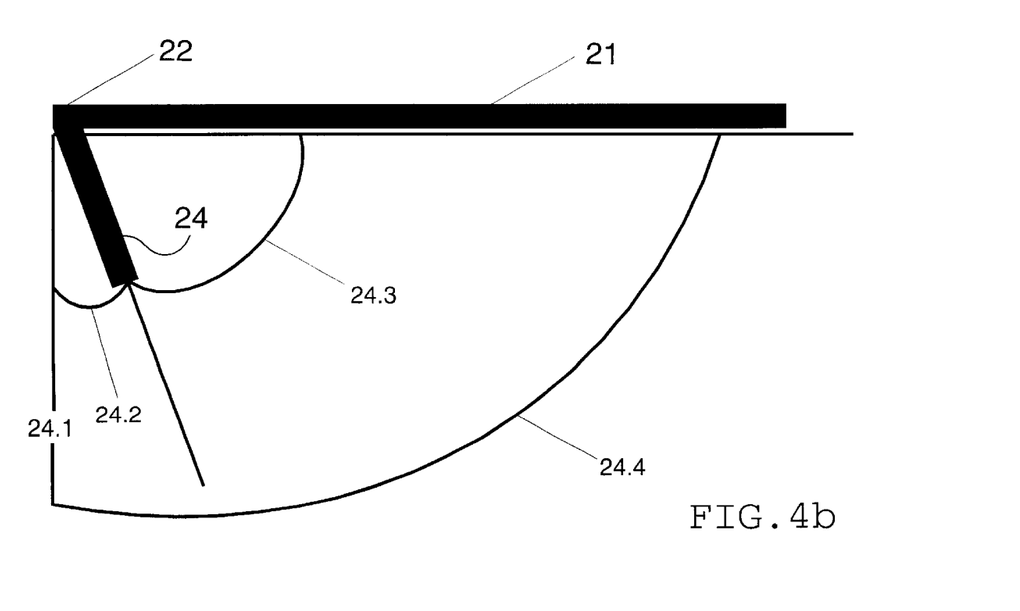

FIGS. 4a and 4b provide even more enlarged views of the disc protectors shown in FIGS. 3a and 3b, respectively. This is done to better illustrate the angle of the protector's continuous perimeter lip 24.

In FIG. 4a three angles are labeled. The first angle 24.4 is an acute angle between two lines; a first line 23.7 (also shown in FIG. 3a) between the perimeter of the main surface and its theoretical center 21.1, shown in FIG. 3a (i.e., the center the main surface would have if the mounting hole 25 shown in FIG. 2a had not been cut out); and a second line 24.1 which touches the perimeter of the main surface and which is parallel to the perpendicular line 23.6 shown in FIG. 3a. The second angle 24.2 is formed between the perpendicular line 24.1 and a line 24.5 that extends in the same direction as the main part of the lip 24 in FIG. 4a. The third angle 24.3 is the angle between the line 24.5 and a portion of the main surface near the location where it is joined with the peripheral lip.

The second angle 24.2 is particularly important because it indicates the extent to which the lip 24 is angled inward so that its lower, unattached end is closer to the center of the disc protector than the upper end of the lip that is joined to the perimeter of the protector's main surface.

It should be noted that in many embodiments of the invention both the main surface 21 and the lip 24 of the disc protector are formed by deforming one continuous sheet transparent material. In such embodiments, the lip and the main surface will typically be connected by a relatively smooth, but narrow-radius curve in the plane of the cross-section shown in FIGS. 4a and 4b, rather than by an intersection between two lines, as shown in those figures.

FIG. 4b is similar to FIG. 4a, except that the main surface 21 of its disc protector has no concavity. The continuous perimeter lip 24 shown in FIG. 4b is labeled using three angles. The angle 24.4 is a right angle between a line lying in the plane of the main surface 21 and a line 24.1 which is perpendicular to that line. The angle labeled 24.2 is formed between the perpendicular line 24.1 and a line that extends in the same direction as the main part of the lip 24 in FIG. 4b. The angle 24.3 is the difference between the right angle 24.4 and the angle 24.2.

Figure 5A:
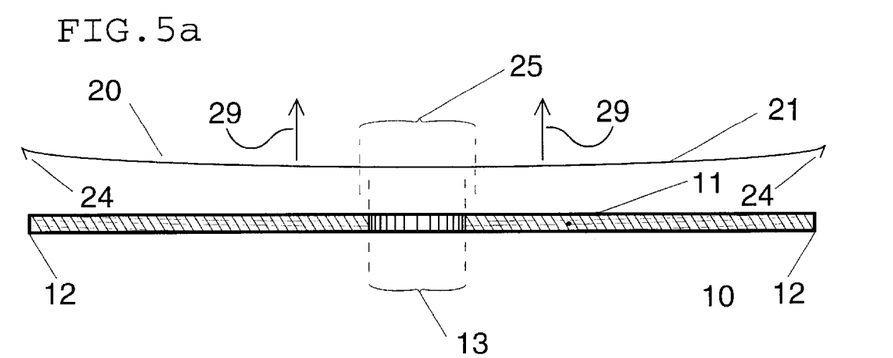
FIGS. 5a, 5b, and 5c are cross-sectional views showing the relationship of the disc protector to the optical disc prior to and immediately after the placing of the disc protectors on one or both sides of an optical disc.
Figure 5B:
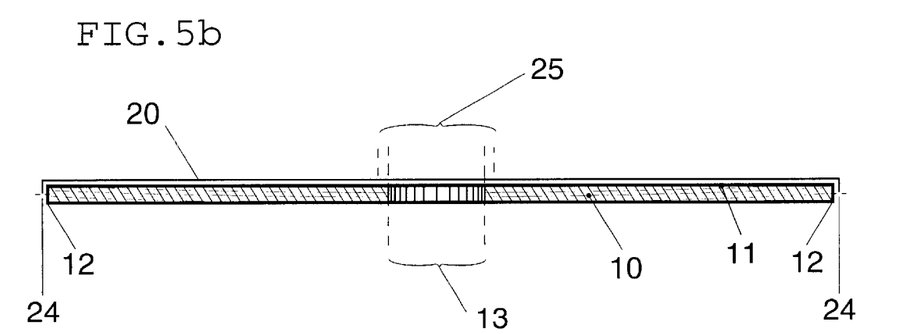
Figure 5C:
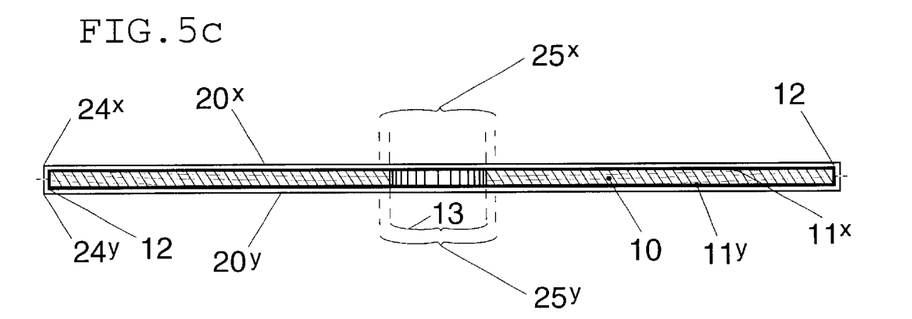

FIGS. 5a, 5b, and 5c illustrate the relationships between disc protectors and optical disc when mounting one or two disc protectors on an optical disc.

FIG. 5a shows an optical disc 10 with one optical disc mask, or protector, 20 prior to being mounted on the disc. The spatial relationship of the protector's mounting hole 25 to the optical disc's mounting hole 13 can be seen. This diagram depicts an embodiment of the disc protector that has a concavity in its main surface 21. The continuous perimeter lip 24 is shown in its rest position, i.e., the state it has when nothing deforms, or bends, the lip from its normal inward angle 24.2 shown in FIG. 4a. Also shown is the main surface 11 of the optical disc and the optical disc's outer edge 12.

FIG. 5b shows the protector 20 of FIG. 5a once it has been fully mounted on one side of the optical disc 10. When the protector is so mounted on the disc, the opposing lower portions of its perimeter lip 24 are bent outward from their rest position by the optical disc's edge 12. As is better shown in FIGS. 7c, 7d, 8c, 8d, and 8e, the elasticity of the lip causes these bent portions to push back against the disc's edge 12, tending to make the protector's lip grab against and hold onto the disc's edge.

As can be seen in FIG. 5b, the protector's lip covers approximately half of the height of the disc's edge 12, so as to leave room for the lip of a second, similar protector that is applied to the other side of the disc. In embodiments of the invention in which it is intended that a disc protector will be applied to only one side of an optical disc, the perimeter lip 24 can be made longer so as to cover more of the outer edge 12 of the optical disc.

The spatial relationship between the protector's mounting hole 25 and the optical disc's mounting hole 13 can also be seen in FIG. 5b. As is suggested by FIG. 5b, the disc protector covers all of the portion of the optical disc's main surface 11 under which data has been recorded, so as to protect that portion of the surface from scratches. If the surface of the protector becomes scratched deeply enough to cause problems in the reading of the optical disc on which it is mounted, the scratched protector can be removed and replaced with a new protector which is un-scratched so as to remove any problem caused by such scratches.

FIG. 5c shows two protectors 20x and 20y mounted on opposite sides of the optical disc 10. The perimeter lips 24x and 24y are bent back by the disc's edge 12, causing those lips to push against and grab that edge (although this is not shown well in FIG. 5c), with each protector's lip covering approximately one half of the height of the disc's edge. The optical disc's main surfaces 11x and 11y are fully encased and protected from moderate outside forces. The spatial relationship between the protectors' mounting holes 25x and 25y and the optical disc's mounting hole 13 is shown in FIG. 5c.

No jig, spacer or installation apparatus is required to mount the invention's disc protectors on an optical disc. A user can apply the optical disc protector to an optical disc simply by using moderate finger pressure along the outer circumference of the optical disc. Adhesives are not necessary to hold the disc protector onto an optical disc, although they can be used to provide even a more secure hold, if desired.

Figures 6A, 6B:
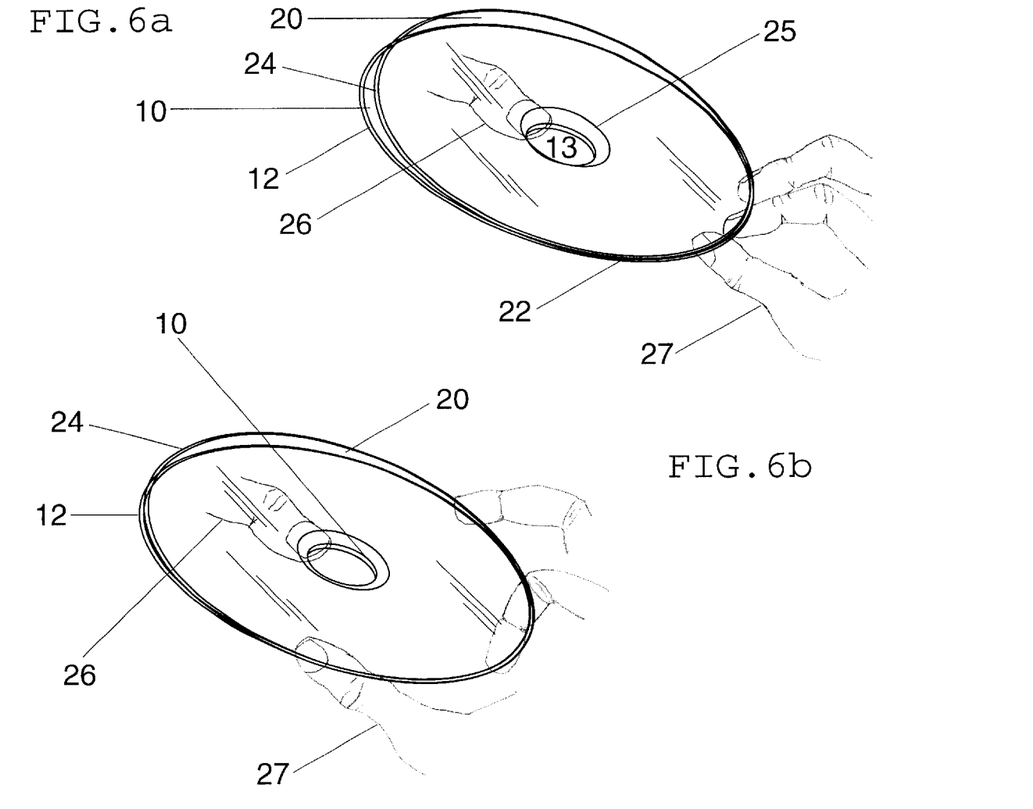
FIGS. 6a, 6b, and 6c provide an illustration of the process of mounting an optical disc protector on an optical disc.
Figure 6C:
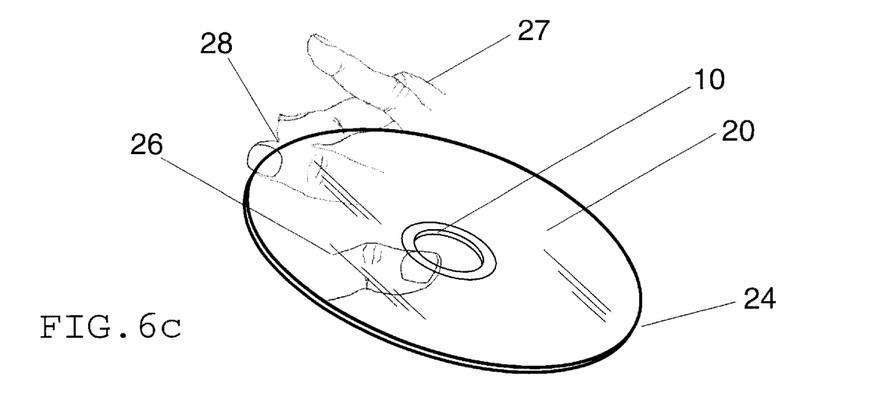

FIGS. 6a, 6b, and 6c illustrate one such method for mounting one of the invention's disc protectors on an optical disc using only one's hands.

As illustrated in FIG. 6a, when the disc protector is to be applied it is recommended that the protector 20 be held by a hand 27 over the optical disc, with a small portion of the protector's peripheral lip 24 overlapping the optical disc's edge 12, and with a thumb 26 holding the mounting hole 25 of the protector and the mounting hole 13 of the optical disc. At this point, a light pressure is applied by the hand 27 pushing an initial portion of the perimeter 22 of the protector's main surface against the perimeter of the main surface of the optical disc and pushing the peripheral lip 24 against the disc's edge 12 so as to bend the lower end of the perimeter lip outward, away from the center of the protector.

As shown in FIG. 6b, the thumb and middle finger of hand 27 then proceed around the disc, lightly pressing the protector's lip 24 down around successive portions of the disc's edge 12. The index finger of hand 27 remains at the starting point to keep the protector's lip mounted over the disc's edge in that area while the thumb and middle finger continue this process of mounting the lip over successive portions of the disc's circumference.

As the thumb and middle finger of hand 27 continue, the thumb 26 must briefly release its hold and remove itself in order for the thumb of hand 27 to continue unimpeded. The thumb 26 once again resumes its hold in the same location but now behind the thumb of hand 27 once the thumb of hand 27 has passed. When the thumb 26 reestablishes its hold, the index finger of hand 27 can be lifted to allow the thumb and middle finger of hand 27 to complete the mounting of the lip all the way around the disc's edge, as shown in FIGS. 6c.

At the completion of installation, the protector's perimeter lip is fully extended as shown in FIG. 5a. The process shown in FIGS. 6a through 6c can be repeated for the application of a second optical disc protector 20 to the opposite side of the optical disc 10. This will cause an optical disc to be protected on both sides as indicated in FIG. 5c.

Figure 7A:
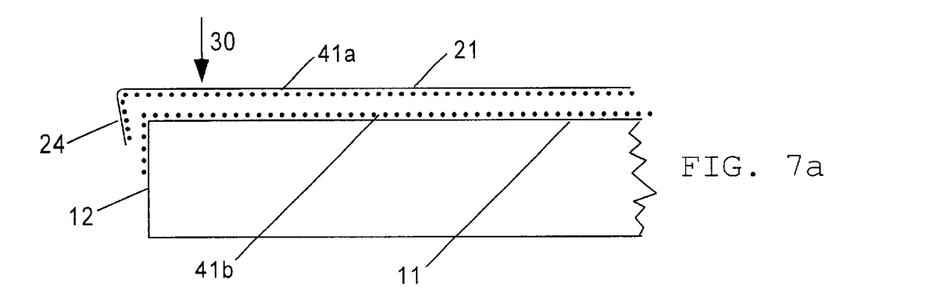
FIGS. 7a, 7b, and 7a are cross-sectional views of outer portions of an optical disc and a non-concave disc protector that is being mounted on the optical disc.
Figure 7B:
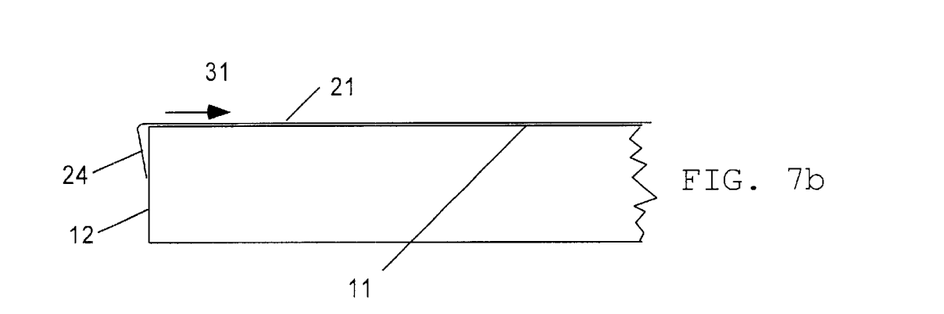
Figure 7C:
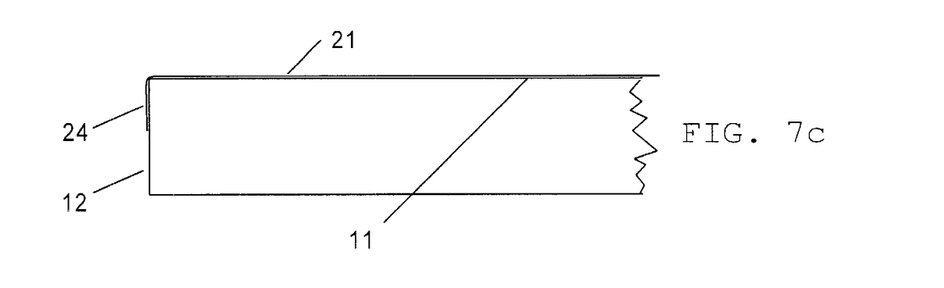
Figure 7D:
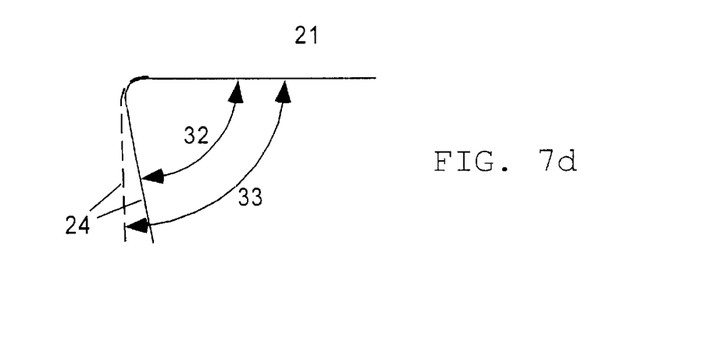
FIG. 7d is a cross-sectional view of the disc protector of FIGS. 7a, 7b, and 7c, illustrating changes in the angle of the disc protector's peripheral lip which occur in those figures.

FIGS. 7a through 7d illustrate how the resilience of the peripheral lip 24 causes it to press tightly against the edge 12 of an optical disc on which it is mounted. In these figures, the protector shown has no concavity. FIG. 7a illustrates an outer edge of a protector's main surface 21 being pressed down toward a corresponding outer edge of one of the main surfaces 11 of an optical disc, in the direction indicated by the arrow 30. FIG. 7b shows the protector with its surface 21 flush against the disc's surface 11, when a force is exerted on the protector to move it in the direction indicated by the arrow 31. This causes the peripheral lip 24 to be deformed from the angle 32 shown in FIG. 7d to the angle 33 shown in that figure, causing the protector to appear as is shown in FIG. 7c, which is the position and shape it will have when the protector is fully mounted on the optical disc. When the edge 12 of the optical disc pushes the resilient material of the lip 24 from the position shown in solid lines in FIG. 7d to the position shown in dotted lines in that figure, it causes that resilient material to push back against that edge, causing the lips to grab the disc tightly.

FIGS. 8a through 8e illustrate how the pressure with which the resilient peripheral lip presses against the edge of an optical disc can be increased by forming the disc protector with a dome-like curvature that makes its exterior-facing side concave and its disc-facing side convex when the protector is not deformed, such as it is by being mounted on an optical disc. In these figures the degree of this curvature has been exaggerated to make it more visible.

Figure 8A:
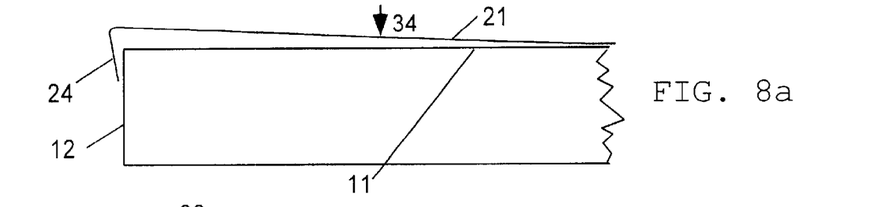
FIGS. 8a, 8b, 8c, and 8d are cross-sectional views of outer portions of an optical disc and a concave disc protector that is being mounted on the optical disc.
Figure 8B:
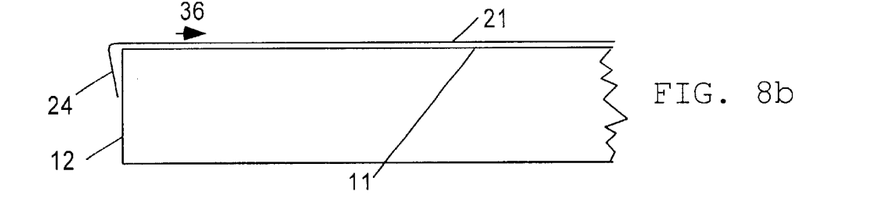
Figure 8C:
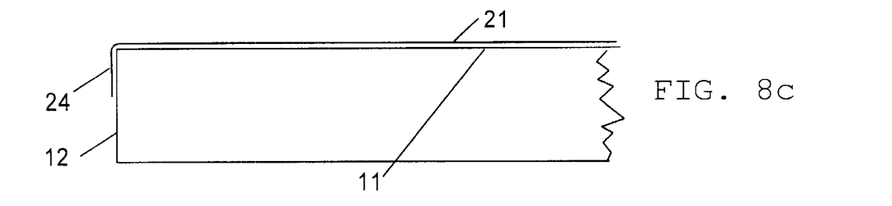
Figure 8D:
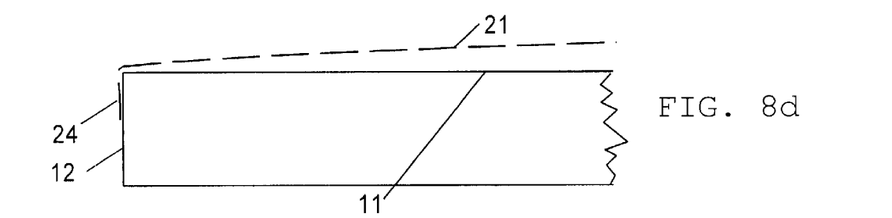

FIGS. 8a through 8c correspond to FIGS. 7a through 7c, except that in them the protector used has a curvature which causes the disc-facing side of the main surface to be convex, meaning that its central portion, which would be to the right in FIG. 8a, bulges downward toward the facing main surface of the optical disc 11 more than does portion of the disc protector near its periphery. As the disc protector is pushed downward in the direction indicated by arrow 34 in FIG. 8a toward the optical disc, it is pushed against the flat surface 11 of the optical disc, which tends to deform the curved main surface of the protector toward a flatter shape, as is indicated in FIGS. 8b and 8c. When the protector is pushed in the direction indicated by the arrow 36 in FIG. 8b, the angle of the lip 24 is bent from the angle it has in that figure to the angle it has in FIG. 8c. In some embodiments of the invention, pushing a disc protector with such curvature against an optical disc will normally cause that curvature to pop inside-out, causing the exterior-facing side of the protector to become convex as is shown in FIG. 8d. The main surface pops out like this because its curvature causes its normal surface area to be greater than a flat circle having the same perimeter, meaning that when the main surface has the flat shape shown in FIGS. 8b and 8c it is unstable because its surface area is being compressed. This compression tends to push the disc out into the shape indicated in FIG. 8d.

Figure 8E:
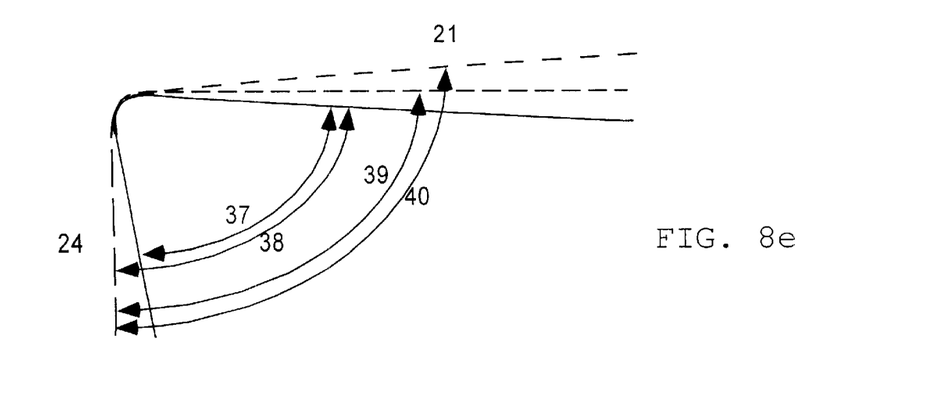
FIG. 8e is a cross-sectional view of the disc protector of FIGS. 8a, 8b, 8c, and 8d, illustrating changes in shape of the disc protector's main surface and peripheral lip which occur those figures.

FIG. 8e indicates that in the embodiment of the invention shown in FIGS. 8a through 8d, the peripheral lip tends to push even more tightly against the edge 12 of the optical disc than it does in the embodiment shown in FIGS. 7a through 7c. This is because in this embodiment the peripheral lip is stretched not only by being pushed outward by the edge 12 of the optical disc (shown in FIGS. 8a through 8d), which would stretch it from angle 37 to angle 38 shown in FIG. 8e, but also because the deformation of the main surface of the disc protector stretches that angle to angle 39 when the dome-like curvature of the main surface is pushed flat, as shown in FIGS. 8b and 8c. It stretches even further, to the angle 40, when the natural concave curvature of the exterior-facing side of the protector pops out into a reverse, convex curvature, as is indicated in FIG. 8d. The extra stretching of the peripheral lips relative to the main surface increases the tightness with which the disc protector holds on to an optical disc on which it has been properly mounted.

Figure 9A:
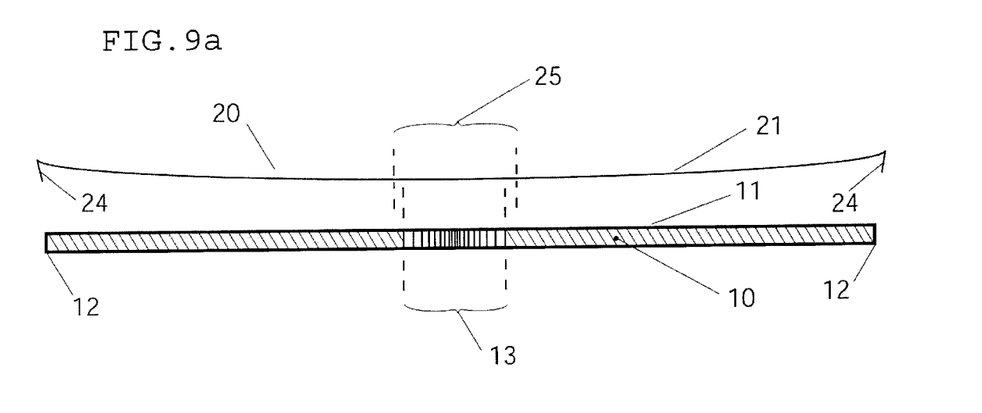
FIGS. 9a and 9b are cross-sectional views of an optical disc and disc protector substantially similar to that shown in FIGS. 5a and 5b, respectively, except that the disc protector shown in FIGS. 9a and 9b has a peripheral lip approximately equal in thickness to the optical disc upon which it is being mounted, and the convex disc facing-surface of the disc protector in FIG. 9a pops out into a concave shaped as shown in FIG. 9b when it is mounted upon the optical disc shown in that figure.
Figure 9B:
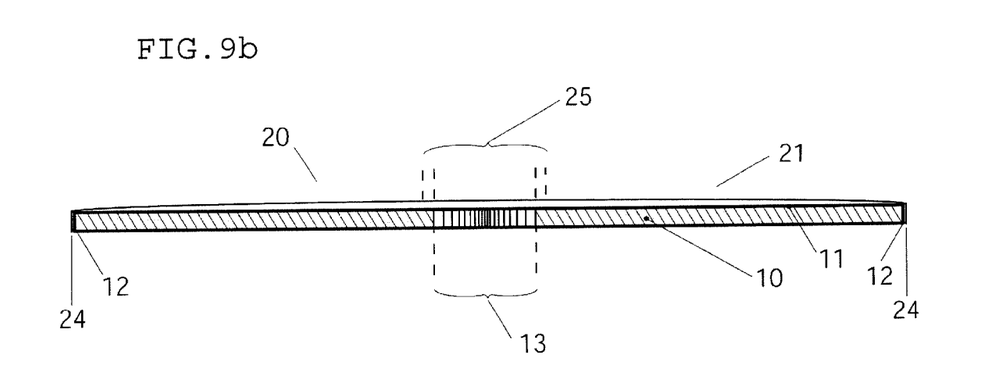

FIGS. 9a and 9b are similar to FIGS. 5a and 5b, respectively, except that the disc protector shown in FIGS. 9a and 9b has a peripheral lip approximately equal in thickness to the optical disc upon which it is being mounted, and the convex disc facing-surface of the disc protector in FIG. 9a pops out into a concave shaped as shown in FIG. 9b when it is mounted upon the optical disc shown in that figure. As is been stated above, when placing a disc protector on only one side of an optical disc it is often advantageous to use a disc protector which has a peripheral lip which extends down further from the main portion of the disc protector than when placing a disc protector on each side of an optical disc, as shown in FIG. 5c, described above. FIG. 9b illustrate the entire cross-sectional view of a disc protector once it's disc-facing surface has popped out from its convex shaped to a concave shaped of the type partially illustrated in FIGS. 8d and 8e, described above.

Furthermore, the electro-static property of the polycarbonate of both the protector and the optical disc can be used in some embodiments of the invention to help attract the protector to the disc, by pulling the protector toward the disc and helping to more tightly lock its peripheral portions to the disc. Preferably the facing surfaces of a disc protector and the disc it is to be mounted on are given opposite electric charges to increase the extent to which they are held together. This is indicated in FIG. 7a in which a charge on one polarity along the disc-facing side of the disc protector is indicated by dots numbered 41a, and a charge of the opposite polarity on the facing surface of the optical disc is indicated by dots numbered 41b. Such attracting charges can also exist between the surface of the peripheral lips which face the edge of the optical disc and those edges. Such attracting charges can also exist on other embodiments of the disc protector such as those shown in FIGS. 8a through 8e.

Because of the various techniques described above for causing the disc protectors of the invention to hold on to the optical discs on which they have been mounted, such protectors will normally stay on such optical discs under normal use without the need for adhesives.

It should be understood that the forgoing descriptions and drawings are given merely to explain and illustrate the invention and that the invention is not to be limited thereto, except in so far as the interpretation of the appended claims are so limited. Those skilled in the art who have the disclosure before them will be able to make modifications and variations therein without departing from the scope of the invention.

What I claim is:

1. An optical disc protector for protecting at least one side of an optical disc upon which said disc protector is mounted, said disc protector comprising:

a circular main surface having a diameter the same as, or slightly larger than, an optical disc on which the protector is designed to be mounted, which main surface:
is in the form of a sheet that has two substantially parallel sides, including a disc-facing side intended to face the optical disc upon which the protector is mounted;
is made of an optically clear material so as to not interfere with the reading of data from an optical disc upon which the protector has been mounted;
has a hole in its center to allow an optical disc upon which such a protector is mounted to be used in an optical disc reader; and
has a slightly dome-shaped curvature that causes the disc-facing side of the main surface to be convex when said disc protector is not being deformed, such as by being mounted on an optical disc; and a peripheral lip attached to, and extending all the way around, the perimeter of the circular main surface, which lip:
extends away from the perimeter of the disc-facing side of the main surface at an inward angle so the diameter of the peripheral lip at its end furthest from the main surface is smaller than the diameter of the main surface and of the optical discs on which the protector is designed to be used; and
is flexible so as to push against the edges of an optical disc when said protector is mounted on such a disc;

wherein when the disc protector is mounted on an optical disc so the peripheral lip extends around the peripheral edge the disc, the convex disc-facing side of the protector's main surface is deformed by being pressed against a flat side of the disc, and the resulting deformation of the main surface bends the peripheral portion of the main surface adjacent to the peripheral lip in a manner which increases the angle between the peripheral lip and the peripheral portion of the main surface, increasing the pressure with which the peripheral lip presses against the edge of the optical disc.

2. An optical disc protector as in claim 1 wherein said optically clear material is polycarbonate.

3. An optical disc protector as in claim 2 wherein said polycarbonate of said circular main surface is electrostatically charged, so the disc-facing side of the main surface will be electrostatically attracted to the side of an optical disc that the disc-facing side faces when the disc protector is mounted on such an optical disc.

4. An optical disc protector as in claim 2 wherein said polycarbonate of said circular main surface is capable of holding an electrostatic charge, so the disc-facing side of the main surface can develop an electrostatic charge that can electrostatically attract said disc-facing side to the side of an optical disc that the disc-facing side faces when the disc protector is mounted on such an optical disc.

5. An optical disc protector as in claim 1 wherein the thickness of the sheet formed by said circular main surface is between five and seven mils.

6. An optical disc protector as in claim 1 wherein said disc protector is formed by a thermoform process.

7. An optical disc protector as in claim 1 wherein said disc protector is formed by a vacuum forming process.

8. An optical disc protector as in claim 1 wherein said circular main surface is made of a material capable of holding an electrostatic charge, so the disc-facing side of the main surface can develop an electrostatic charge that can electrostatically attract said disc-facing side to the side of an optical disc that the disc-facing side faces when the disc protector is mounted on such an optical disc.

9. An optical disc protector as in claim 1 wherein said peripheral lip does not contain a clasp for grabbing against the opposite side of the optical disc from the side against which the disc-facing side of the main surface is designed to lie.

10. An optical disc protector for protecting at least one side of an optical disc upon which said disc protector is mounted, said disc protector comprising:
    a circular main surface having a diameter the same as, or slightly larger than, an optical disc on which the protector is designed to be mounted, which main surface:
        is in the form of a sheet that has two substantially parallel sides, including a disc-facing side intended to face the optical disc upon which the protector is mounted;
        is made of an optically clear material so as to not interfere with the reading of data from an optical disc upon which the protector has been mounted;
        has a hole in its center to allow an optical disc upon which such a protector is mounted to be used in an optical disc reader; and
        has a slightly dome-shaped curvature that causes the disc-facing side of the main surface to be convex when said disc protector is not being deformed, such as by being mounted on an optical disc, thus causing the area of the main surface to be larger than a flat surface having the same diameter; and
    a peripheral lip attached to, and extending all the way around, the perimeter of the circular main surface, which lip:
        extends away from the perimeter of the disc-facing side of the main surface at an inward angle so the diameter of the peripheral lip at its end furthest from the main surface is smaller than the diameter of the main surface and of the optical discs on which the protector is designed to be used; and
        is flexible so as to push against the edges of an optical disc when said protector is mounted on such a disc;
    wherein when the disc protector is mounted on an optical disc so the peripheral lip extends around the peripheral edge the disc, the area of the convex disc-facing side of the protector's main surface is compressed by being pressed against a flat side of the disc in such a way that the curvature of the disc-facing surface will pop inside-out, causing the disc-facing surface to become concave, and the resulting deformation of the disc facing surface from a convex to a concave curvature bends the peripheral portion of the main surface adjacent to the peripheral lip in a manner which increases the angle between the peripheral lip and the peripheral portion of the main surface, increasing the pressure with which the peripheral lip presses against the edge of the optical disc.

11. An optical disc protector as in claim 10 wherein said peripheral lip does not contain a clasp for grabbing against the opposite side of the optical disc from the side against which the disc-facing side of the main surface is designed to lie.

12. A protected optical disc comprising:
    an optical disc;
    one or more optical disc protectors mounted on the optical disc, each for protecting one side of the optical disc, and each including:
        a circular main surface having a diameter the same as, or slightly larger than, the optical disc, which main surface:
            is in the form of a sheet that has two substantially parallel sides, including a disc-facing side that faces the optical disc upon which the protector is mounted;
            is made of an optically clear material so as to not interfere with the reading of data from the optical disc;
            has a hole in its center to allow the optical disc upon which such a protector is mounted to be used in an optical disc reader; and
            has been manufactured so the disc facing side of the main surface has a slightly dome-shaped convex curvature before the disc protector is deformed by being mounted on the optical disc; and
        a peripheral lip attached to, and extending all the way around, the perimeter of the circular main surface, which lip:
            extends away from the perimeter of the disc-facing side of the main surface;
            has been manufactured to extend away from main surface's perimeter at an inward angle so the diameter of the peripheral lip at its end furthest from the main surface is smaller than the diameter of both the main surface and the optical disc before the disc protector is deformed by being mounted on the optical disc; and
            is flexible so as to push against the edges of the optical disc once the protector has been mounted on the disc;
        wherein the disc protector is mounted on the optical disc so the peripheral lip extends around the peripheral edge of the disc, causing the convex disc-facing side of the protector's main surface to be deformed by being pressed against a flat side of the disc, and the resulting deformation of the main surface bends the peripheral portion of the main surface adjacent to the peripheral lip in a manner which increases the angle between the peripheral lip and the peripheral portion of the main surface, increasing the elastic pressure with which the peripheral lip presses against the edge of the optical disc.

13. A protected optical disc as in claim 12 wherein:
    there are two of said disc protectors mounted on the optical disc; and
    each of them has a peripheral lip which covers a portion of the edge of the optical disc, but neither of which lips overlaps each other.

14. A protected optical disc as in claim 13 wherein the length of the peripheral lip of each of the two disc protectors in a direction away from the disc protector's main surface is equal to or less than one half of the thickness of the optical disc.

15. A protected optical disc as in claim 14 wherein:

there is only one of said disc protectors mounted on the optical disc; and the length of the peripheral lip in a direction away from the disc protector's main surface covers more than ½ of the width of the edge of the optical disc.

16. A protected optical disc as in claim 15 wherein the length of the peripheral lip in a direction away from the disc protector's main surface is approximately equal to the thickness of the optical disc upon which it is mounted.

17. A protected optical disc as in claim 12 wherein the peripheral lip of none of the one or more disc protectors mounted on said disc contain a clasp for grabbing against the opposite side of the optical disc from the side against which the disc-facing side of each such disc protector's main surface lies.

18. An optical disc protector as in claim 12 wherein:

said slightly dome-shaped curvature that causes the disc-facing side of the main surface to be convex when said disc protector is not being deformed, gives the main surface an area larger than a flat surface having the same diameter; and when the disc protector is mounted on an optical disc, the area of the protector's main surface is compressed by being pressed against a flat side of the disc in such a way that the curvature of the disc-facing surface pops inside-out, causing the disc-facing surface to become concave, and the resulting deformation of the disc facing surface from a convex to a concave curvature bends the peripheral portion of the main surface adjacent to the peripheral lip in a manner which increases the angle between the peripheral lip and the peripheral portion of the main surface, increasing the pressure with which the peripheral lip presses against the edge of the optical disc.

* * * * *